(12) United States Patent
Le Roux et al.

(10) Patent No.: US 9,630,357 B2
(45) Date of Patent: Apr. 25, 2017

(54) DEVICE FOR TRANSPORTING A HOLLOW BODY COMPRISING A MAGNETICALLY ACTUATED GRIPPING MEANS

(71) Applicant: SIDEL PARTICIPATIONS, Octeville sur Mer (FR)

(72) Inventors: Julien Le Roux, Octeville sur Mer (FR); Willy Dujardin, Octeville sur Mer (FR)

(73) Assignee: SIDEL PARTICIPATIONS, Octeville sur Mer (FR)

( * ) Notice: Subject to any disclaimer, the term of this patent is extended or adjusted under 35 U.S.C. 154(b) by 0 days.

(21) Appl. No.: 15/039,755

(22) PCT Filed: Nov. 26, 2014

(86) PCT No.: PCT/EP2014/075612
§ 371 (c)(1),
(2) Date: May 26, 2016

(87) PCT Pub. No.: WO2015/078888
PCT Pub. Date: Apr. 6, 2015

(65) Prior Publication Data
US 2017/0001362 A1    Jan. 5, 2017

(30) Foreign Application Priority Data
Nov. 28, 2013  (FR) ..................... 13 61751

(51) Int. Cl.
*B25J 15/02* (2006.01)
*B29C 49/42* (2006.01)
(Continued)

(52) U.S. Cl.
CPC ........ *B29C 49/4205* (2013.01); *B29C 31/008* (2013.01); *B29C 49/56* (2013.01); *B65G 47/90* (2013.01)

(58) Field of Classification Search
CPC ... B29C 31/008; B29C 49/56; B29C 49/4205; B29C 49/06; B65G 47/90;
(Continued)

(56) References Cited

U.S. PATENT DOCUMENTS 4,082,175 A * 4/1978 Gibbemeyer ....... B29C 49/4205
                                                198/377.02
4,487,568 A * 12/1984 Wiatt ...................... B29C 49/28
                                                425/534
(Continued)

FOREIGN PATENT DOCUMENTS

EP       1 880 825 A1    1/2008
WO       2011/001357 A2  1/2011

OTHER PUBLICATIONS

International Search Report, dated Feb. 5, 2015, from corresponding PCT Application.

*Primary Examiner* — Stephen Vu
(74) *Attorney, Agent, or Firm* — Young & Thompson (57) ABSTRACT

A device for transporting a hollow body provided with a neck which includes a vertically oriented internal wall, the device including at least elements for gripping the hollow body by engaging with the internal wall of the neck, which are mounted on the lower free end of a rod and movably connected thereto, the rod being mounted to be vertically movable between a high position and a low position, wherein the gripping elements are mounted to be radially movable between a retracted position in which the gripping elements are vertically inserted from top to bottom into the neck, without contacting the internal wall, and a deployed position in which the gripping elements engage the internal wall of the neck, and the change in position of the gripping elements from the retracted to the deployed position and/or from the deployed to the retracted position is actuated by a magnetic field.

17 Claims, 7 Drawing Sheets

(51) Int. Cl.
*B29C 31/00* (2006.01)
*B29C 49/56* (2006.01)
*B65G 47/90* (2006.01)

(58) Field of Classification Search
CPC .............. B65G 2201/02; B65G 47/842; A22C 21/0053; B66C 1/54; B29D 30/0016; B23Q 1/00; B25J 15/00; Y10T 29/53991
See application file for complete search history.

(56) References Cited

U.S. PATENT DOCUMENTS

| | | | | |
|---|---|---|---|---|
| 4,572,355 A | * | 2/1986 | Hunter | ................ B29C 49/4205 198/803.12 |
| 4,927,205 A | * | 5/1990 | Bowler | .................... B05B 5/08 118/503 |
| 6,761,556 B1 | * | 7/2004 | Pellegatta | ........... B29C 49/4205 198/803.12 |
| 2008/0017779 A1 | | 1/2008 | Lapert | |
| 2013/0015040 A1 | | 1/2013 | Leroux et al. | |

* cited by examiner

DEVICE FOR TRANSPORTING A HOLLOW BODY COMPRISING A MAGNETICALLY ACTUATED GRIPPING MEANS

This invention relates to a device for transporting a hollow body comprising magnetically-activated gripping means.

This invention relates more particularly to a device for transporting a hollow body that is equipped with a neck that comprises a vertically-oriented cylindrical inner wall and an upper edge that circumferentially delimits an opening for access to the inside of said hollow body, with said device comprising at least means for gripping the hollow body by engaging with the inner wall of the neck that are mounted at the lower free end of a rod and are movably connected to the rod, with said rod being mounted to move vertically between:

A top position in which the gripping means are retracted upward by the rod to make it possible to insert the neck of the hollow body radially into a specified reference position in relation to the gripping means of the device, and A bottom position in which the gripping means engage radially with the inner wall of the neck to ensure the gripping of the hollow body.

Transport devices that comprise means for gripping a hollow body that is equipped with a neck, in particular for gripping a hollow body that is made of thermoplastic material, such as a preform or a container (bottle, flask, jar, etc.), are known from the state of the art.

For the gripping by the necks of such hollow bodies, in particular two types of gripping means are distinguished: on the one hand, the gripping means that engage mainly with the outside of the neck, and, on the other hand, the gripping means that engage only with the inside of the neck of the hollow body.

According to this distinction, the gripping means of the device according to the invention are of the second type, i.e., gripping means that hold the hollow body by the inside of the neck by engaging with the cylindrical inner wall of the neck, with the outside of the neck being free and detached.

By leaving the outside of the neck free and detached, the gripping means of the second type in particular allow the gripping of the neck by other gripping means, in particular for the purposes of a transfer of the hollow body.

By way of a nonlimiting example, such other means consist of, for example, clamps whose jaws engage with the outside of the neck, in particular with an outer threading or an annular groove based on the type of neck. The jaws are accommodated, for example, in an annular groove of the neck that is adjacent to a radial collar, with said groove being, in a known way, designed to accommodate subsequently a tamper-proof ring after the final stoppering of the container.

The document WO-00/48819 describes an example of a transport device comprising gripping means of the first type, a document to which reference will be made for more details.

By comparison with a transport device according to the first type, the gripping of the hollow body by the inside of the neck with means for gripping a device of the second type is often more difficult to implement.

The inner wall of the neck is smooth, which limits the possibilities of engagement with gripping means.

One of the main problems encountered remains the reliability of the gripping that results from the engagement by friction of the gripping means with the inner wall.

The gripping means according to the state of the art are in particular very sensitive to dimensional tolerances that exist on the inner diameter of the neck of the hollow body.

In the case of a hollow body made of thermoplastic material such as a preform or a container (bottle, flask, jar, etc.), the specification of the dimensions of the inner diameter of the neck of the hollow body is determined by the quality of the manufacture of the preform, which preform is generally obtained by an injection molding (or, as a variant, by extrusion).

The document EP-1,880,825 describes an example of a device for transporting a hollow body that comprises gripping means of the second type that are able to ensure its gripping by the inside of the neck.

The gripping means comprise balls that, designed to engage with the inner wall, are forced radially toward the outside by elastically deformable O-rings, with said rings being inserted radially between a central core and the balls arranged on the periphery.

In this document, the gripping means have—in the free state, before their insertion inside the neck—an outer diameter that is greater than the inner diameter of the neck.

The gripping means are arranged at the lower end of a rod and are movably connected to the rod, with said rod being mounted to move vertically between a top position and a bottom position.

Gripping is achieved by lowering the rod toward the neck to shrink-on the gripping means there by force, with the contact with the neck radially stressing the balls and bringing about an elastic deformation of said O-rings.

The release is achieved by raising the rod and by exerting by means of an ejector an opposite-direction thrust force on the edge (or lip) of the neck of the preform for extracting said gripping means from it.

In particular because of the injection-molding method of the often different preforms and supply sources, as well as sometimes for the manufacture of the same container, the inner diameter of the necks in reality often has wide variability that produces problems, in particular when the neck of the preform is gripped (operation that is also called "covering").

It should be noted that these gripping problems are also likely to be encountered with the intermediate containers (or parisons) or the finished containers to be manufactured from such preforms since these preforms have, at the end of their manufacture, a neck that has its final shape, i.e., the neck of the preform corresponds to the neck of the final container that is to be obtained.

The gripping means according to this document have advantageously made it possible to improve the reliability owing to the use of balls that limit the frictional forces during the insertion (or the extraction) of gripping means inside the neck.

However, even if the tolerances to variations of the inner diameter of the neck have been significantly improved in relation to the prior art, these tolerances at times remain inadequate and problems also arise during the gripping in particular.

The operation of the gripping means of the transport device according to this state of the art is therefore not fully satisfactory.

In an installation for manufacturing containers from preforms, with the economic consequences of these problems being particularly significant (scraps, degradations of the heating means in the furnace, disruptions and even shutdowns of the manufacturing installation, etc.), solutions are still sought for ways to increase the tolerances of the gripping means to variations of the inner diameters of the necks of the hollow bodies.

The purpose of this invention is in particular to propose a device for transporting a hollow body whose gripping means have a higher tolerance to variations of the inner diameters of the necks, while retaining all of the advantages of speed and simplicity of operation of the transport device according to the state of the art.

For this purpose, the invention proposes a device for transporting a hollow body that is equipped with a neck of the type described above, characterized in that the gripping means are mounted to move radially between:

A retracted position in which the gripping means are inserted vertically from top to bottom inside the neck, without contact with the inner wall, and A deployed position in which the gripping means engage with the inner wall of the neck, and in that the change in position of the gripping means from at least one to the other of said retracted and deployed positions is actuated by a magnetic field produced by magnetic means.

Owing to the magnetic field produced by the magnetic means, the actuation of the gripping means between the retracted and deployed positions is achieved in a simple, fast and reliable manner.

Advantageously, the use of permanent magnets as magnetic means makes it possible to achieve an actuation of the gripping means without any addition of energy.

Advantageously, the magnetic means are arranged for acting on the gripping means based on the vertical movement of the rod, with said magnetic means bringing about the change in position of said gripping means toward the deployed position at almost the same time as they are inserted inside the neck.

By comparison with mechanical-type actuating means, the magnetic means have numerous advantages, in particular the absence of wear and tear between the magnetic means and the gripping means because of the absence of contact and friction.

In this connection, it will be recalled that in the case of application to the transport of preforms into a furnace of an installation for manufacturing containers, the rates that are always higher lead to a number of successive gripping (covering) and release (uncovering) operations that are very significant, and the reliability of the gripping means is essential to the proper operation of a container manufacturing installation.

This is why it is important to retain a functioning of the gripping means that is as fast as it is simple while also being highly reliable.

Advantageously, the magnetic means are arranged on the support to act automatically on the gripping means movably connected to the rod, during the end of travel for lowering toward its bottom position of said rod.

For gripping, the insertion of the gripping means and the control of the change in position from the retracted position toward the deployed position are achieved following the same vertical movement of the rod, from the top position toward the bottom position.

Conversely for the release, the extraction of the gripping means from the neck and the control of the change in position of the gripping means from the deployed position toward the retracted position are achieved with the incorporation of return means and following the same vertical upward movement of the rod.

Owing to the means for returning gripping means toward the retracted position, the gripping means always occupy a retracted position in which said gripping means have an outer diameter that is smaller than the inside diameter of the neck of the preform.

Advantageously, owing to the stop means that are present in said retracted position, said gripping means returned toward the retracted position occupy a well-defined position.

Advantageously, the insertion inside the neck of the gripping means in the retracted position is done without force, without contact with the inner wall.

By comparison, in the state of the art, the gripping means were in contact with the inner wall during the entire course of insertion resulting from the lowering of the rod.

Actually, the neck radially forces the balls there against elastically deformable O-rings to bring about the reduction of the outer diameter, since this outer diameter is initially greater than the inner diameter of the neck.

The O-rings thus have an essential role in the operation of the state of the art EP-1,880,825.

According to a first case depicted ("narrow neck"), the deformation of the O-rings can—because of the inner diameter of the neck and tolerances with regard to the latter—be inadequate so that the gripping means can be inserted vertically completely inside the neck. Such a fault in gripping the neck can have different consequences.

First, this fault leads to incorrect positioning of the preform whose axis does not extend vertically but with a given slope, in particular because of the absence of engagement of the stop of the base with the edge of the neck and the swiveling contact of the balls with the inner wall.

In the case of an individual preform transport device equipping a furnace, the body of a thus inclined preform is then likely to cause damage by coming into contact with the heating means, such as infrared lamps.

Next, even if the preform extends vertically, the vertical position of the neck is then incorrect in relation to gripping means designed to grip it by the neck or, to take again the above-mentioned example application in a furnace, induces an incorrect positioning of the neck in relation to the cooling means and/or the means for protecting the neck, and this also applies to the body in relation to the heating means of the furnace.

According to a second case depicted ("wide neck"), if, because of the inner diameter of the neck and tolerances with regard to the latter, the deformation of the O-rings is inadequate, then the force applied by the balls on the inner wall of the neck may also be inadequate. Such a fault in gripping the neck can there again have different consequences.

For example, driving the preform in rotation on itself during the thermal conditioning of its body can be disrupted in the event that there is sliding between the balls and the inner wall for taking again the above-mentioned example application of the transport device in a furnace.

The transport device according to the invention advantageously resolves these problems sometimes encountered with a device according to the state of the art EP-1,880,825 while also improving the operational characteristics, in particular the speed, the simplicity, and the reliability for carrying out the gripping and the release by the inside of its neck of a hollow body.

In the invention, the gripping is achieved automatically in one and the same movement of the rod in the direction of the neck, with the magnetic field that forces the gripping means toward the deployed position at the end of the vertical movement travel of the rod in the direction of the neck, or in the bottom position, with the change in position taking place at almost the same time as the insertion of the gripping means inside the neck.

Advantageously, after the gripping means are retracted vertically upward, the hollow body and the transport device are able to be positioned relative to one another so that the hollow body occupies a specified reference position in which the neck is vertically aligned in relation to the gripping means, following the main axis of the transport device.

Advantageously, the release of a hollow body that is oriented "neck up" is achieved simply by gravity. The raising of the rod causes the forcing, by the magnetic field, of the gripping means toward the deployed position to cease, and preferably return means automatically bring about the return of the gripping means toward the retracted position, releasing the hollow body held until then by the inside of its neck.

Owing to the actuation of the gripping means by the magnetic means according to the invention, the ejector that is present in the transport devices according to the state of the art can be eliminated.

Advantageously, the elimination of such an ejector makes it possible to eliminate certain drawbacks that are associated with it, such as the risk of deterioration of the upper edge (lip) of the neck whose dimensions, which are becoming smaller and smaller, go together with a steadily increased fragility.

Advantageously, the elimination of the ejector leaves the upper edge of the neck entirely free to carry out other functions, in particular, according to the applications, a centering of the gripping means in relation to the neck of the hollow body.

According to other characteristics of the invention:
Said gripping means are forced into said deployed position by means of said magnetic field;
Said magnetic means for actuating gripping means comprise at least first magnetic means that selectively bring about the change in position of said gripping means, at least from the retracted position toward the deployed position, by application of said magnetic field on the gripping means;
Said first magnetic means aremounted on a support of the device in relation to which the rod is mounted to move vertically in such a way that said first magnetic means bring about the change in position of said gripping means from the retracted position toward the deployed position when the rod, moved vertically downward from its top position, reaches its bottom position;
Said first magnetic means are arranged on the support of the device for producing a circumferentially continuous magnetic field;
The first magnetic means consist of permanent magnets;
The gripping means are returned automatically toward the retracted position by return means;
The magnetic means for actuating gripping means comprise second magnetic means that are carried by said gripping means;
The second magnetic means are arranged relative to the first magnetic means so as to have a polarity that is identical to that of said first magnetic means in such a way as to exert on one another a mutually repelling magnetic force;
The means for returning the gripping means toward the retracted position consist of said second magnetic means;
The second magnetic means consist of permanent magnets;
In the deployed position, said second magnetic means that are carried by the gripping means are offset, vertically downward, in relation to said first magnetic means carried by the support;
The gripping means are mounted to move in rotation between said retracted and deployed positions around an axis;
The gripping means consist of levers, each lever vertically comprising, on both sides of said axis of rotation, an upper actuating part and a lower gripping part that are connected by an intermediate connecting part comprising said axis;
The device comprises stop means that determine the retracted position of the gripping means.

Other characteristics and advantages of this invention will emerge from reading the detailed description that will follow for the understanding of which reference will be made to the drawings in which.

In the description below, the "vertical" orientations along the axis X of the device and the "radial" orientations orthogonally to said axis will be adopted by way of a nonlimiting example and to facilitate the comprehension thereof, with the "vertical" orientation being given arbitrarily and without any reference to Earth's gravity.

By way of a nonlimiting example, the terms "top" or "bottom" as well as "higher" or "lower" with reference to the vertical orientation and "outside" or "inside" with reference to the radial orientation and in relation to the axis X for the transport device or the axis O for the hollow body will be used.

FIGS. 2 to 10 show a device 10 for transporting a hollow body according to an embodiment of the invention.

A transport device 10 according to the invention is used in particular for individually transporting a hollow body made of thermoplastic material that is formed by a preform 12 in a furnace (not shown) of a container manufacturing installation.

Figure 1:
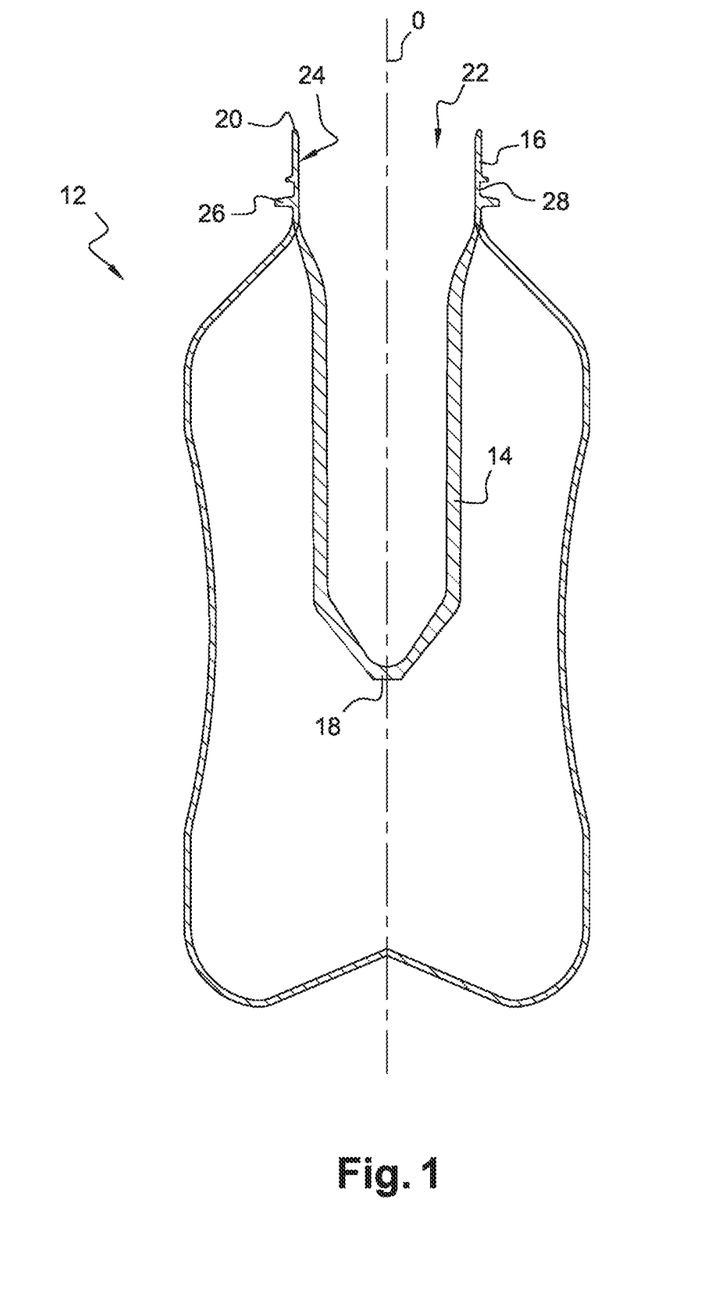
FIG. 1 is a vertical cutaway view that shows an example of a hollow body equipped with a neck and according to this example illustrates a preform as well as the container (bottle) that can be manufactured from such a preform made of thermoplastic material.

FIG. 1 shows, in a vertical cutaway, a nonlimiting embodiment of a hollow body initially constituted by a preform 12 made of thermoplastic material that is designed to be transformed subsequently into a container, such as a bottle that is also shown in FIG. 1.

In the description, the term "container" refers in a non-limiting manner to a final container such as a so-called intermediate container (also called a parison).

The preform 12 that is made of thermoplastic material, such as PET, is, for example, thermally conditioned in the furnace of the installation, and this is done prior to its transformation into a container that is produced by blow molding (or stretch blow molding) of said preform in a mold, by means of at least one pressurized fluid generally constituted by air.

It is recalled that a preform 12 is generally manufactured by injection of thermoplastic material into a mold and that the preform 12 that is obtained comprises a neck in its final shape, i.e., identical to that of the final container.

Consequently, a transport device 10 is equally able to ensure, for a neck of a given diameter, the gripping of the preform 12 like that of the final container, owing to which the transport device 10 according to the invention can be used throughout such an installation.

As will have been understood, the use of a transport device 10 according to the invention is therefore in no way limited to that of a preform, moreover not to that of preforms in a furnace that constitutes only one example application.

As shown in FIG. 1, the preform 12 has a main axis O that extends here in the vertical direction.

The preform 12 comprises a vertical body 14 that is equipped at one end with a neck 16 and closed at the opposite end by a bottom 18.

The neck 16 comprises an edge 20 (or lip) that circumferentially delimits an opening 22 for access to the inside of the hollow body 14 of the preform 12 and comprises an inner wall 24. In FIG. 1, said inner wall 24 is cylindrical and extends vertically in a rectilinear manner with an essentially constant inner diameter.

As a variant, the inner wall 24 of the neck 16 is slightly inclined in relation to the vertical and/or the inner wall 24 is staged, with a variation of the inner diameter.

In the embodiment shown in FIG. 1, the neck 16 comprises a collar 26 that extends radially toward the outside, projecting in relation to the body 14, and which vertically delimits a joining area of the neck 16 with the body 14.

According to this example, the neck 16 comprises on the outside a threading that is designed to make possible the subsequent closing of the container by a mating screw cap and also comprises an annular groove 28 that is designed to accommodate a tamper-proof ring.

In the case of the particular application to the transport of a preform 12 into the furnace of a container manufacturing installation, the neck 16 having its final shape, only the body 14 of the preform 12 is heated by heating means for the purpose of softening its constituent material, such as halogen lamps or equivalent means.

Figure 2:
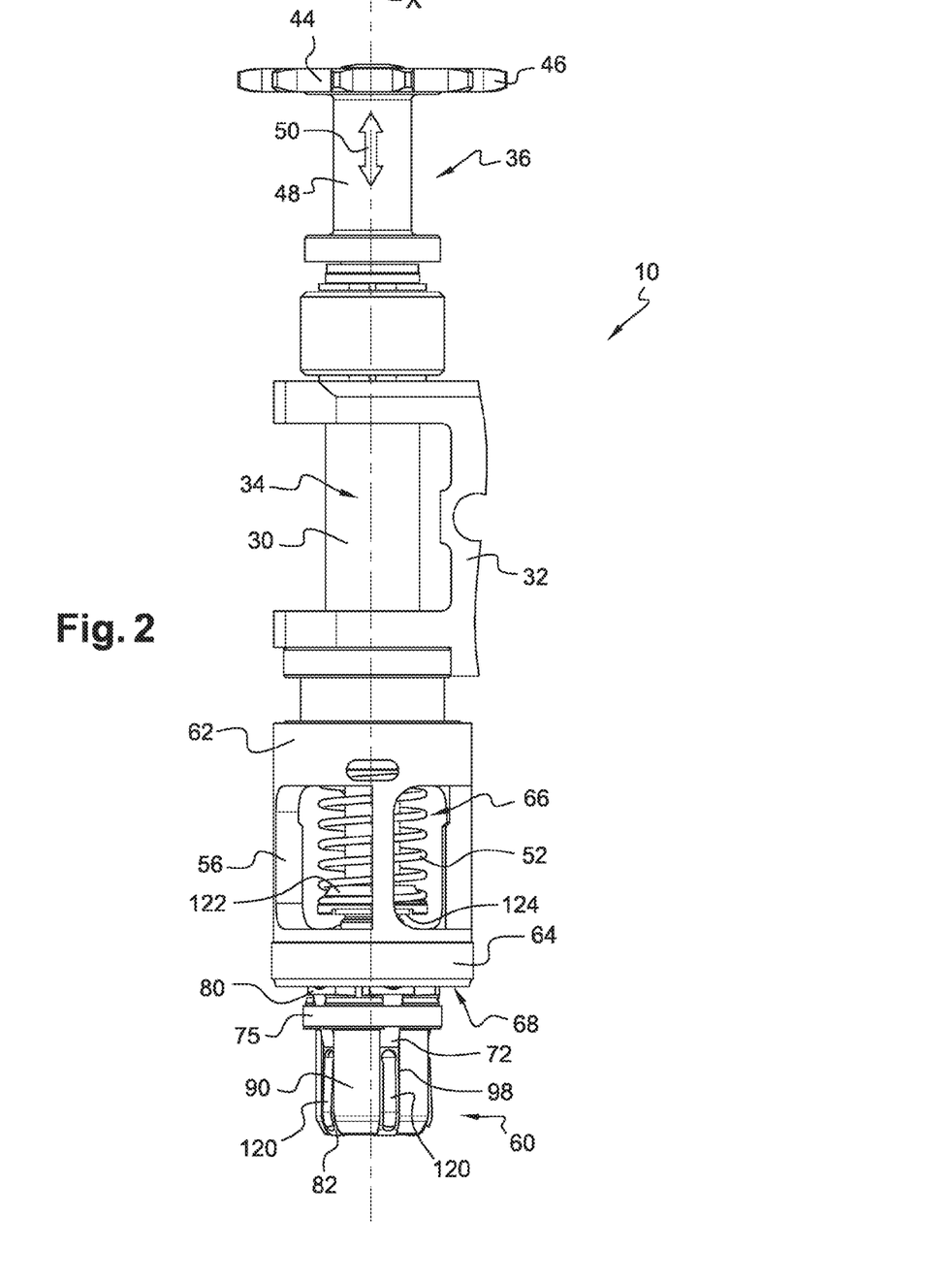
FIG. 2 is a front view that shows a transport device comprising gripping means that are magnetically actuated according to an embodiment of the invention.

As shown in particular in FIG. 2, the transport device 10 comprises a body 30 that forms a stationary reference in relation to the other movable parts of the device 10.

Figure 8:
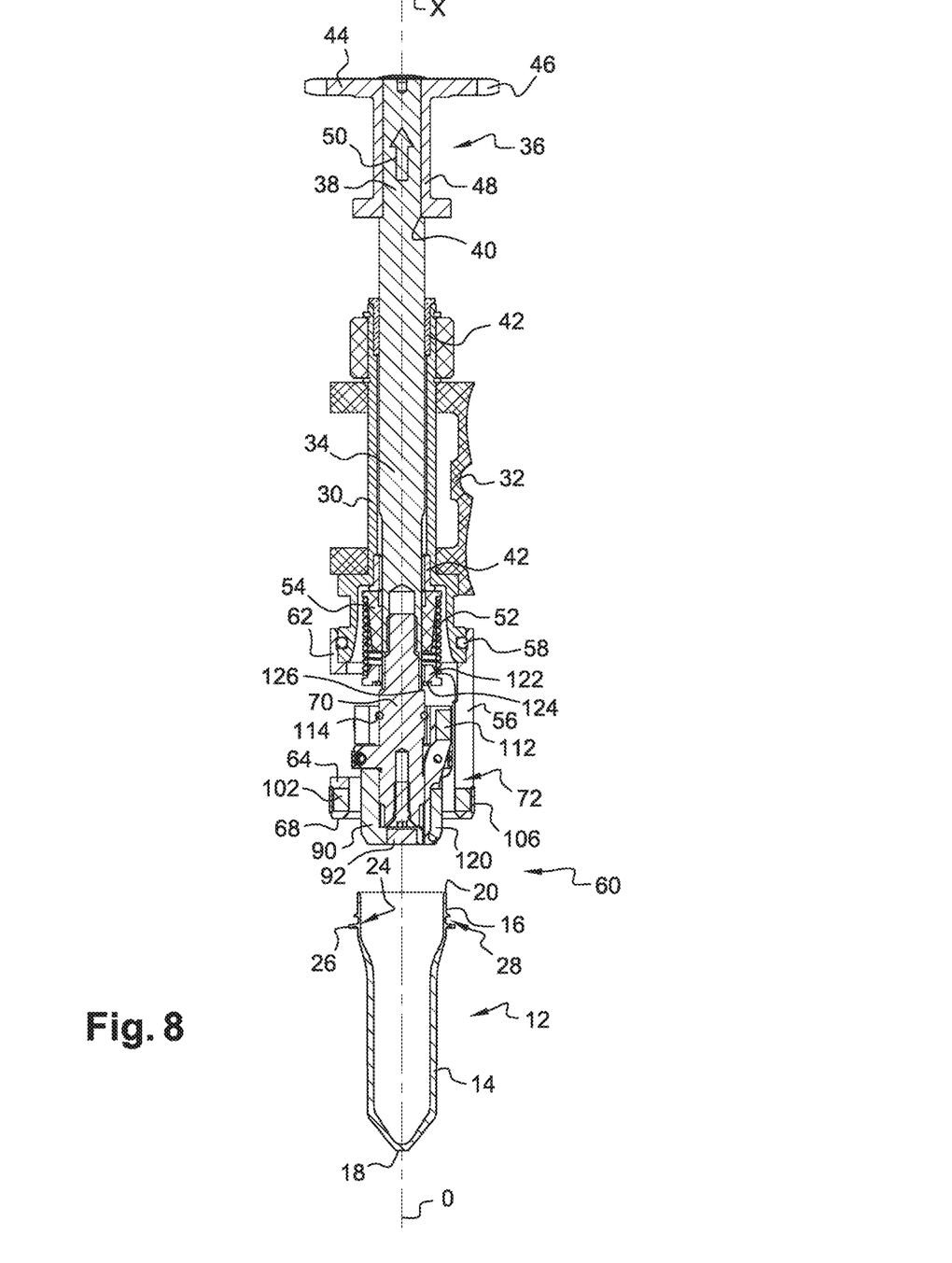
FIGS. 8 to 10 are cutaway views that show the transport device according to the embodiment and that illustrate the successively occupied operating positions for carrying out the gripping (or the release) of a hollow body that is equipped with a neck, such as a preform or a container according to FIG. 1.
Figure 9:
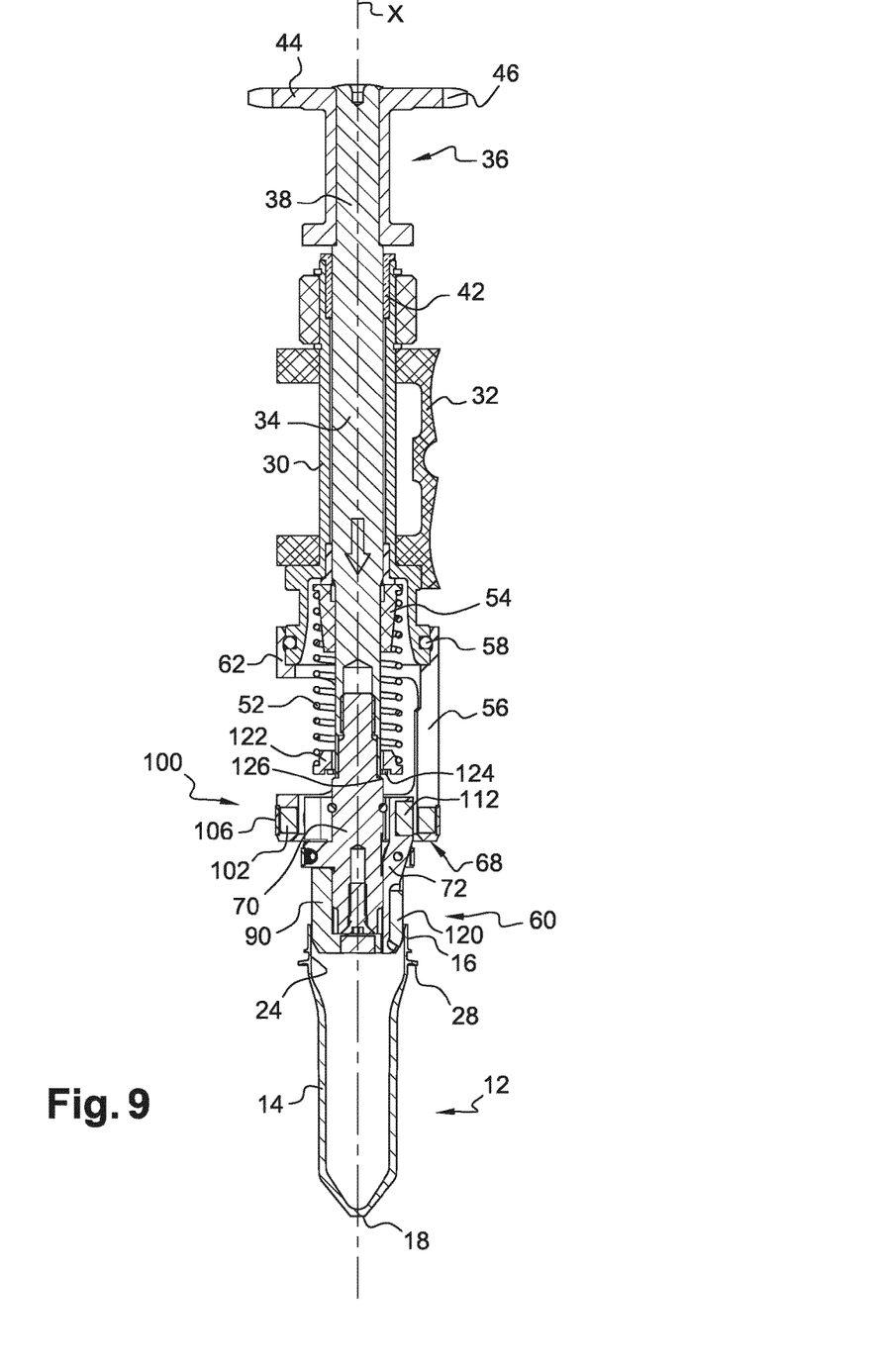
Figure 10:
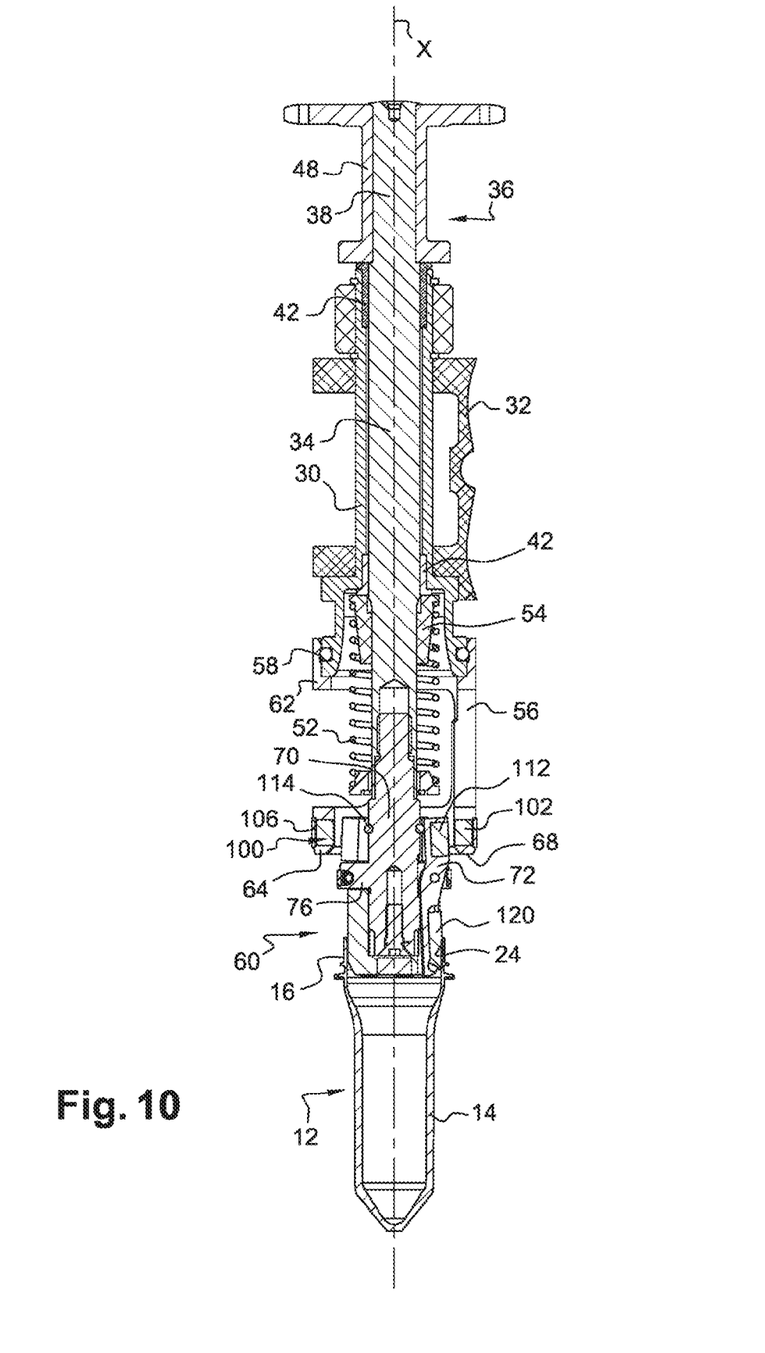

The transport device 10 is shown in a cutaway view in FIGS. 8 to 10, to which reference will advantageously be made.

The body 30 comprises a connecting part 32 that can be movably connected to a transport system, such as a chain or a belt, in such a way as to make possible the driving of the transport device 10, in particular along a specified heating pass inside the furnace.

The transport device 10 comprises at least one rod 34, a so-called control rod, which is mounted to move vertically in relation to the body 30 along the axis X of the transport device 10.

The transport device 10 comprises a part 36 for driving the control rod 34.

The driving part 36 is penetrated through its center by an upper part 38 of the rod 34 that, with a smaller cross-section than that of the part of the rod 34 that slides vertically in the body 30, delimits a shoulder 40 for said driving part 36.

The driving part 36 is movably connected to said rod 34, on the one hand vertically, and, on the other hand, in rotation around the main axis X of the transport device 10.

Preferably, small cushions 42 are inserted between the body 30 and the rod 34, for example at each upper and lower end of the body 30.

Overall in a vertical cutaway, the driving part 36 has a "T" shape and respectively comprises a radially-oriented part from which another vertically-oriented part extends downward.

The radial part is formed by a pinion 44 that circumferentially comprises a set of teeth 46 designed to engage with mating engagement means (not shown) for driving the rod 34 in rotation around the axis X.

The pinion 44 has as its function, by means of the rod 34, to drive in rotation on itself the preform 12 that is transported individually by the device 10.

Such a function is applied in particular in the thermal conditioning of preforms 12 in the furnace of a container manufacturing installation.

Putting the preform 12 into rotation on itself on at least a part of the heating pass in the furnace is designed to achieve a homogeneous thermal conditioning of the preform 12. In addition, this is why such a transport device 10 is sometimes also called a "spinner."

The vertical part of the driving part 36 of the rod 34 forms a hub 48 that is designed to engage with associated actuating means 50.

The actuating means 50 are designed to control selectively the vertical movement of the control rod 34, with said rod 34 being mounted to slide in relation to the body 30.

The actuating means 50 of the rod 34 comprise, for example, a fork that engages with the hub 48 to move it vertically and that is controlled selectively for this purpose by an actuator, such as a cam and roller mechanism.

In FIG. 2, the actuating means 50 of the rod 34 are shown diagrammatically by a double arrow, and then in FIGS. 8 to 10, the arrows correspond to the direction of movement of the rod 34, moved by said means 50, at least vertically upward.

Advantageously, the rod 34 is mounted to move vertically along the axis X between at least a first position, a so-called bottom position, and a second position, a so-called top position.

Preferably, the rod 34 is mounted to move vertically upward against an element 52 for returning the rod toward the bottom position. The return element 52 is formed here by, for example, a spring, which, supported on the body 30, forces the rod 34 toward its bottom position.

Based on the force that is applied by the actuating means 50 on the hub 48 of the driving part 36, the spring 52 automatically returns the control rod 34 toward the bottom position.

The actuating means 50 control only the vertical movement of the rod 34 from the bottom position toward the top position by exerting on the rod 34 a traction force that is greater than the return force exerted by the spring 52.

Advantageously, the downward vertical movement of the rod 34, from the top position toward the bottom position, is then achieved automatically owing to the return spring 52 of the rod by ceasing to apply said traction force to the driving part 36.

As a variant, in the absence of such a return spring 52 of the rod 34, the actuating means 50 control the vertical movement of the rod 34 toward one and the other of said bottom and top positions.

The return spring 52 of the rod extends vertically around a lower part of the rod 34 that penetrates through its center; the upper end of the spring 52 is supported on a ring 54 that is also penetrated by the rod 34 that slides.

The ring 54 is immobilized vertically upward by the body 30, with said ring 54 being supported on the body 30 with insertion of a radially-oriented part of the lower small cushion 42.

The transport device 10 comprises a support 56 whose upper part is securely connected onto the body 30, for example here by elastic interlocking by means of a joint 58 (see FIG. 8) accommodated in a groove (not shown) made inside the upper part of the support 56.

The transport device 10 comprises gripping means 60 designed to engage with the inner wall 24 to ensure the gripping of the hollow body by the inside of the neck 16, here the individual gripping of the preform 12.

Owing to the gripping means 60 according to the invention, the part corresponding to the ejector in a transport device of the state of the art can advantageously be eliminated.

However, in the embodiment described below and illustrated in detail by FIG. 3, the support 56 consists of a part that is similar to such an ejector, although from now on, said part is deprived of this function of ejecting the hollow body at the end of the transport.

Advantageously, the invention can therefore be used in an existing transport device 10 in which the ejector would be replaced by a support 56 and new gripping means 60 mounted at the free end of the control rod 34.

The support 56 is a part that can be easily and quickly detached in particular for facilitating access to the gripping means 60.

Preferably, such a removable support 56 facilitates any intervention on said gripping means 60, such as, for example, their change for other gripping means 60 in the case of a manufacturing of another container that has a neck having different diameter characteristics.

As illustrated in FIG. 2, the support 56 is a cylindrical part that, locally perforated, delimits a volume inside of which is accommodated at least a portion of the means 60 for gripping the transport device 10.

The support 56 comprises an upper edge 62, here circumferentially continuous, for its attachment to the body 30 by means of the joint 58. The support 56 comprises a lower edge 64 that is preferably circumferentially continuous.

Based on the vertical position of the rod 34 (see FIGS. 8 to 10), the gripping means 60 are totally or partially retracted inside a housing 66 of the support 56 in such a way as to make possible in particular the radial insertion of a neck 16 of the preform 12 perpendicular to the gripping means 60.

The gripping means 60 are mounted at the lower end of the control rod 34 to which said gripping means 60 are movably connected vertically.

Preferably, the gripping means 60 are removable and securely connected onto the end of the rod 34, for example here by screwing.

As a variant, the gripping means 60 are attached to the end of the rod 34 by any other suitable attachment means such as a bayonet mounting.

In the bottom position of the rod 34 as illustrated in FIG. 2, the gripping means 60 extend vertically beyond a radial face 68 of the lower edge 64 of the support 56 in such a way as to be able to be inserted inside the neck 16 of the preform 12 without interference with the support 56.

The rod 34 of the transport device 10 comprises an end fitting 70 that comprises the gripping means 60, with said end fitting 70 comprising a threaded upper end that is designed to be accommodated in a mating tapped hole of the rod 34, made centrally on its lower end.

Advantageously, the lower part (also called "spinner nose") of the rod 34 formed by the end fitting 70 functionally comprising the gripping means 60 of the neck 16 is thus the only part of the device 10 to be detached.

The gripping means 60 are integral with the rod 34 by means of said end fitting 70, and the gripping means 60 carried by the end fitting 70 are movably connected vertically to the rod 34.

The gripping means 60 are driven vertically upward by the control rod 34 when the rod 34 is moved toward its top position by the actuating means 50, against return means formed by the spring 52.

As indicated above, the retraction of the gripping means 60 has in particular as its object to make possible the radial insertion of the neck 16 of the preform 12 into a specified reference position in relation to the transport device 10 and more particularly in relation to said gripping means 60.

Advantageously, the functional travel of the rod 34 between the bottom and top positions is all the more reduced when the neck 16 of the preform 12 is arranged in said specified reference position that is close to the gripping means 60.

The specified reference position of the neck 16 corresponds to a position illustrated in FIG. 8 in which the neck 16 is aligned vertically in relation to the gripping means 60, with the axis O of the preform 12 advantageously being merged with the main axis X of the transport device 10.

With the preform 12 being in said reference position and oriented in a so-called "neck up" position in which the body 14 extends vertically below the neck 16, the neck 16 is then placed vertically below, perpendicular to the gripping means 60.

Owing to the retraction of the gripping means 60, the neck 16 can be brought as close as possible to occupy said reference position without there being any interference between the neck 16 and the gripping means 60 (or else the support 56).

Advantageously, the vertical travel of the rod 34 for implementing both the gripping and the release of the preform 12 by the gripping means 60 is reduced by the same token.

In the bottom position of the rod 34, the gripping means 60 engage radially with the inner wall 24 of the neck 16 to ensure the gripping of the preform 12.

The gripping means 60 are mounted to move radially between:

A retracted position in which the gripping means 60 are inserted vertically from top to bottom inside the neck 16, without contact with the inner wall 24, and A deployed position in which the gripping means 60 engage with the inner wall 24 of the neck 16.

The change in position of the gripping means 60 from at least one toward the other of said retracted and deployed positions is actuated by a magnetic field.

The magnetic field acting on the gripping means 60 is produced by magnetic means.

In the embodiment illustrated in particular by FIGS. 3 to 7, the gripping means 60 are mounted to move in rotation between said retracted and deployed positions around an axis A, which axis A is encompassed in a radial plane that is orthogonal to the axis X of the rod 34.

According to this embodiment, the gripping means 60 consist of levers 72 that are mounted to pivot around articulation means 74 defining the axis A of rotation.

Preferably, the levers 72 are distributed circumferentially in a uniform manner around the end fitting 70 of the rod 34 that is here securely connected by screwing onto the lower free end of the rod 34.

The end fitting 70 comprises an annular part 76 that extends radially projecting toward the outside. The annular part 76 circumferentially comprises a series of housings 78 in each of which is mounted a lever 72 and articulation means 74 that are associated with it.

Preferably, the set of levers 72 is locked in the housings 78 by an elastic ring 75 that surrounds the annular part 76 and closes each of the housings 78 that is open at least radially toward the outside.

Each lever 72 comprises, vertically on both sides of said axis A of rotation, an upper actuating part 80 and a lower gripping part 82 that are connected by an intermediate connecting part 84.

The lever 72 constitutes a so-called lever of the first type in which the axis is located between the driving force and the resistant force, such as in, for example, Roman scales.

Advantageously, the force applied on the upper actuating part 80 of the lever by the magnetic means is amplified by the lever arm, which increases the gripping force applied opposite by the lower gripping part 82.

The intermediate connecting part 84 of each lever 72 is accommodated in one of the housings 78 of the annular part 76 of the end fitting 70 of the rod 34 and encircled by said elastic ring 75.

Each lever 72 comprises a perforation 86 for the through passage of the articulation means 74 along said axis A.

The articulation means 74 consist of a shaft that passes through the lever 72 on both sides in the area of the perforation 86, with said shaft 74 being held in the annular part 76 by locking means 77 arranged at each of its ends for locking it in translation.

The levers 72 are carried by the annular part 76 of the end fitting and by so doing movably connected to the rod 34, with each lever 72 remaining free to pivot around the articulation means 74, respectively between said retracted and deployed positions.

Advantageously, the device 10 comprises stop means 88 that determine the retracted position of the gripping means 60.

Preferably, the gripping means 60 are automatically returned toward said position that is retracted and supported against said stop means 88.

The stop means 88 are formed by a part of the outer surface of the end fitting 70 of the control rod 34 that, adjacent and arranged vertically below the annular part 76, engages with a support face 85 that each lever 72 comprises radially to the inside.

Figure 5:
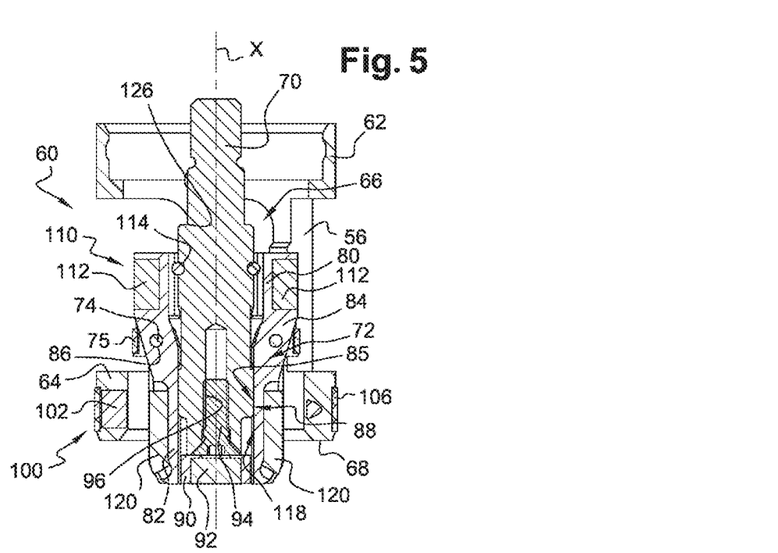

As illustrated more particularly in the vertical cutaway of FIG. 5 showing the levers 72 in the retracted position, each lever 72 that is returned automatically toward its retracted position is stopped by its support face 85 against a part that is radially opposite the cylindrical outer surface of the end fitting 70 of the rod 34 forming said stop means 88.

In the retracted position, each lever 72 extends vertically, parallel overall to the rod 34 and the axis X of the transport device 10.

The retracted position of the levers 72 determines a minimum outer diameter of the gripping means 60 for which said gripping means 60 can be inserted vertically inside a neck 16 of the preform 12, without contact with the inner wall 24.

Preferably, the device 10 comprises centering means 90 that are designed to engage with a part of the neck 16 and that are inserted inside the neck 16 of the preform 12 with the gripping means 60.

The centering means 90 are formed by, for example, a centering device that, advantageously removable, is attached to the lower end of the end fitting 70 of the rod 34.

Preferably, the attachment between the centering device forming the centering means 90 and the end fitting 70 of the rod 34 is produced here by means of a permanent magnet 92.

The end fitting 70 is preferably made of a non-magnetic material, such as stainless steel, to limit the disruptions of the magnetic field.

The holding of the centering device 90 by the magnet 92 is obtained, for example, by means of a screw 94 that, manufactured from a ferromagnetic material, is accommodated in a hole 96 that extends vertically inside the lower end of the end fitting 70 of the rod 34.

The force of attraction exerted by the magnet 92 on the head of the screw 94 makes it possible to attach the centering device 90 to the end fitting and therefore to the rod 34.

Such magnetic attachment means offer the advantage of making it possible to carry out an assembly or disassembly operation of the centering device 90 very quickly and without tools.

As a variant, the centering means 90 are attached by any other means to the end of the end fitting 70 of the rod 34.

By way of example, an attachment by screwing could be achieved by means of a screw (analogous to the screw 94), whose body would be accommodated in a mating tapped hole (such as the hole 96) and whose head would be supported on a part of the centering means 90, such as a counterbore.

The centering means 90 comprise vertical slots 98 distributed circumferentially in a uniform manner and extending vertically in a rectilinear manner that are each designed to accommodate one of the levers 72, with said levers 72 being free in particular to be deployed radially toward the outside.

As illustrated in FIG. 2, the centering means 90 and the gripping means 60 are, once assembled, respectively interlocked in one another.

Preferably, the number N of levers 72 is an odd number, with the number N being between, for example, 3 and 7.

Advantageously, the gripping means 60 according to the embodiment comprise five levers 72, distributed over the periphery of the end fitting 70 of the rod 34.

The magnetic actuating means of the gripping means 60 according to the invention comprise at least the first magnetic means 100.

The first magnetic means 100 are designed to actuate said gripping means 60 owing to a magnetic field.

The first magnetic means 100 can selectively bring about the change in position of said gripping means 60, at least from the retracted position toward the deployed position, by application of the magnetic field.

Preferably, the first magnetic means 100 are formed by permanent magnets 102.

As a variant, the first magnetic means 100 are formed by at least one electromagnet.

Preferably, the first magnetic means 100 are arranged radially outside of the gripping means 60 and are carried by, for example, the support 56 of the device 10.

Figure 3:
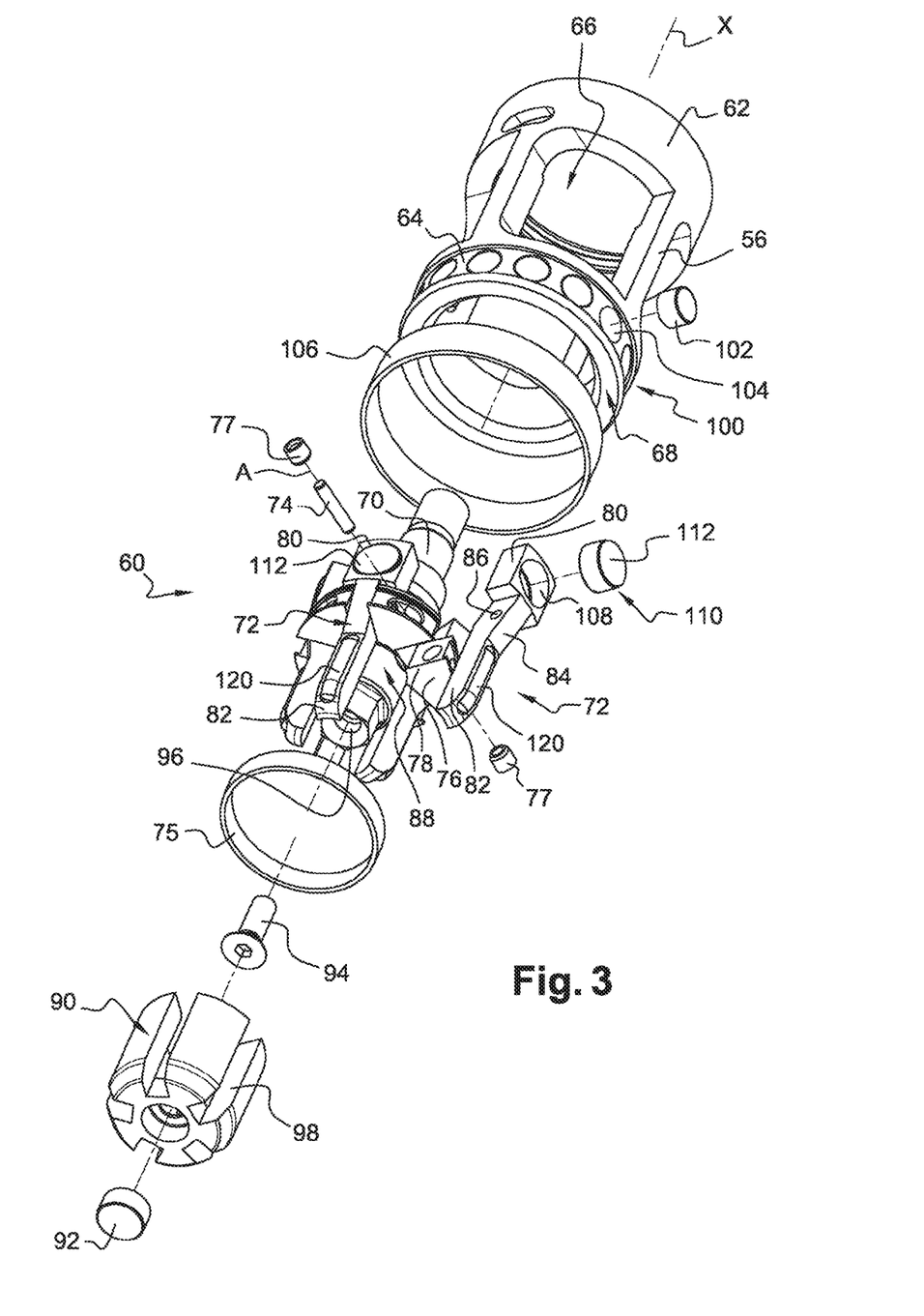
FIG. 3 is a perspective exploded view that shows in detail the lower part of the transport device according to FIG. 2, with said lower part (or "spinner nose") comprising said gripping means being detachable in relation to the rod.
Figure 4:
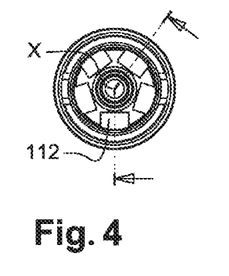
FIGS. 4 and 5 are cutaway views that show the lower part for gripping the transport device according to FIG. 3, with FIG. 4 showing a radial cutaway made vertically at the height of the second magnetic means that are integral with the gripping means and that illustrate the vertical cutting plane corresponding to FIG. 5, with FIG. 5 illustrating in cutaway said lower part with said gripping means occupying the retracted position.

As illustrated by FIG. 3, the magnets 102 that form the first magnetic means 100 are each mounted in a housing 104 made in the lower edge 64 of the support 56.

Preferably, the housings 104 are only open radially toward the outside, and an elastic ring 106 radially locks the magnets 102 in the housings 104.

As a variant, the elastic ring 106 can be eliminated by attaching each magnet 102 in its housing 104 by bonding, clamping or by molding the magnets 102 with the support 56.

Preferably, the magnets 102 are arranged circumferentially over the entire periphery of the support 56 and the magnets 102 are juxtaposed, close to one another, with a space between them that is as small as possible.

By way of a nonlimiting example, the number of magnets 102 here is sixteen, distributed uniformly in the edge 64 of the support 56.

Advantageously, the magnets 102 generate a magnetic field in the direction of the gripping means 60 that is annular, circumferentially continuous overall.

The magnetic field produced by the set of magnets 102 that acts on the gripping means 60 is consequently essentially the same regardless of the relative angular position of the levers 72 that form the gripping means 60 in relation to the magnets 102 carried by the support 56.

Thus, when the rod 34 is driven in rotation around the axis X by means of the pinion 44 of the driving part 36, the angular position of each lever 72 relative to the magnets 102 varies continuously but the magnetic field that stresses the levers 72 remains essentially identical.

Advantageously, driving a preform 12 in rotation by means of the gripping means 60 linked to the rod 34 is done smoothly without, for each lever 72, the magnetic field that forces it toward the deployed position varying during the passage of the magnetic field produced by a magnet 102 to the magnetic field produced by the next magnet 102.

The transition from the magnetic field of a given magnet 102 to the magnetic field of the magnet 102 following it is done without breaking or altering the field and consequently prevents a "catch" effect that otherwise could take place during the driving in rotation of the gripping means 60 and the passage from the magnetic field of a magnet 102 to that of the next magnet 102.

The overall magnetic field produced by the first magnetic means 100 permanently keeps the gripping means 60 in the deployed position, regardless of the angular position of the lever 72 driven in rotation by the rod 34.

In the embodiment, the magnetic means for actuating the gripping means 60 advantageously comprise second magnetic means 110 that are carried by the levers 72 that form said gripping means 60.

The second magnetic means 110 are movably connected to the levers 72 forming said gripping means 60 that pivot between said retracted and deployed positions.

Advantageously, the second magnetic means 110 are formed by permanent magnets 112.

Each lever 72 comprises, in its upper actuating part 80, a box that comprises a housing 108 in which is mounted one of the magnets 112 forming the second magnetic means 110.

Advantageously, the magnets 112 are molded with the upper part 80 of the levers 72, as a variant kept in the housings 108 by any suitable attachment means.

The second magnetic means 110 are arranged relative to the first magnetic means 100 to have a polarity that is identical to the polarity of said first magnetic means 100 in such a way as to obtain a repelling force when the first magnetic means 100 and the second magnetic means 110 are brought face to face, vertically aligned overall.

The rule is recalled according to which: when one of the ends of a magnetic element, such as one of the magnets 102, is approached from one end of another magnetic element, such as one of the magnets 112, a repelling force then arises between them if the ends that are brought into place have identical polarities (or conversely a force of attraction if their polarities are opposite).

When the second magnetic means 110 formed by the magnets 112 are radially opposite the first magnetic means 100 formed by the magnets 102, here following the vertical movement of the rod 34 relative to the support 56, the magnets 102 and 112 then exert on one another a mutually repelling magnetic force.

Figure 7:
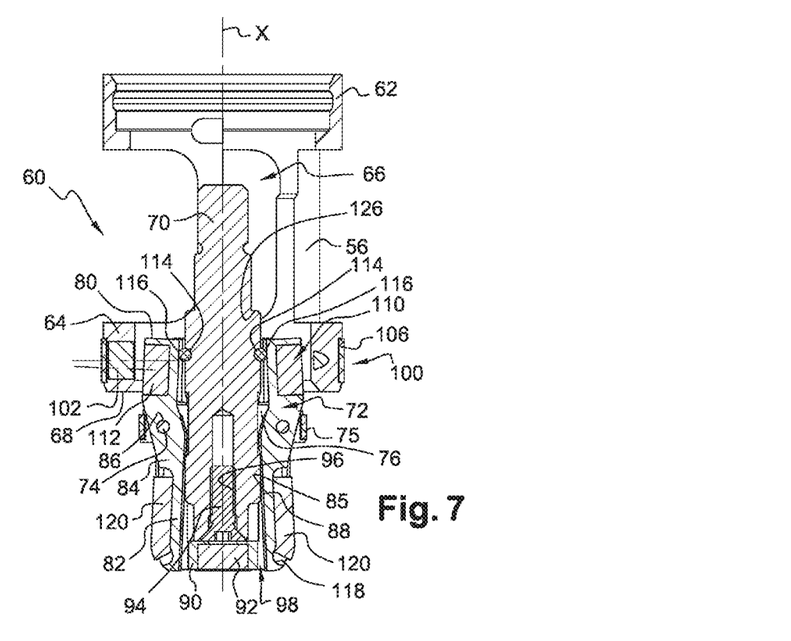

In the embodiment, when the rod 34 is moved vertically downward from its top position shown in FIG. 5 to its bottom position shown in FIG. 7, the first magnetic means 100 then automatically bring about—by repelling—the change in position of said gripping means 60 from the retracted position toward the deployed position.

When the rod 34 reaches its bottom position, the magnets 102 exert a repelling magnetic force on each magnet 112 carried by one of the levers 72, and the magnets 112 also exert a mutually repelling magnetic force on the magnets 102.

The mutually repelling forces that are exerted between the magnets 102 and 112 bring about the change in position of the gripping means 60 formed by the levers 72 that pivot toward the deployed position in which the lower gripping part 82 of each lever 72 can engage with the inner wall 24 of the neck 16 of a preform 12 to ensure its gripping.

Advantageously, the gripping means 60 are forced into said deployed position by a magnetic field.

Preferably, said magnetic field is a repelling force produced jointly by said first magnetic means 100 and by the second magnetic means 110.

Preferably, the gripping means 60 are automatically returned toward the retracted position by return means.

Advantageously, the means for returning gripping means 60 toward the retracted position consist of said second magnetic means 110.

Each magnet 110 carried by a lever 72 exerts on a part of the other magnets 110 subjected to its magnetic field a repelling force that, oriented radially toward the outside, keeps each of the levers 72 in its retracted position.

Actually, the magnets 110 all have the same polarity radially inside such that the magnets 110 carried by the levers 72 will push one another back.

As a variant, the gripping means 60 are elastically returned toward the retracted position, for example by means of return means that consist of at least one spring associated with each lever 72.

Advantageously, the levers 72 that form the gripping means 60 are returned magnetically into the retracted position by the repelling force that each of the magnets 112 exerts on the other magnets 112 having the same polarity and quite particularly those arranged radially and opposite overall.

Outside of the magnetic field of the first magnetic means 100, the repelling forces of the magnets 112 are exerted on the upper actuating part 80 of each lever 72 comprising a magnet 112 and tend to pivot the lever 72 radially toward the outside around the axis A that is defined by the articulation means 74, i.e., in the opposite direction of the deployed position.

The repelling forces at work return each lever 72 into its retracted position, with said retracted position being determined by the face 85 of the lever 72 abutting against the part of the outer surface of the end fitting 70 arranged radially opposite, which surface constitutes stop means 88 of all of the levers 72 in this embodiment.

Advantageously, the second magnetic means 110 consequently have a dual function, on the one hand, a function for returning gripping means 60 toward the retracted position, and, on the other hand, a function in the actuation of the gripping means 60.

The second magnetic means 110 interact by repelling with the first magnetic means 100 and therefore participate in causing by magnetic repelling the change in position of the gripping means 60 toward the deployed position, and then their hold in said deployed position for which the gripping by its neck 16 of a preform 12 is achieved.

In the embodiment, the retracted or deployed position that a lever 72 occupies is determined by the intensity of the repelling forces being applied to said lever.

When the second magnetic means 110 are not in the magnetic field of the first magnetic means 100, then the levers 72 are only subjected to the repelling force of the magnets 112, and by so doing are returned magnetically toward the retracted position.

By contrast, when the second magnetic means 110 enter into the magnetic field of the first magnetic means 100, the levers 72 are then forced by repelling forces that are greater than those returning them toward the retracted position and the change in position toward the deployed position that is achieved.

The intensity of the repelling forces produced by the magnetic field of the first magnetic means 100 should therefore be greater than that produced by the second magnetic means 110.

In the embodiment, the magnets 102 and 112 are preferably identical, but the number of magnets 102 is greater than the number of magnets 112 in such a way as to obtain repelling magnetic forces for the actuation that are greater than those for returning toward the retracted position.

FIG. 5 shows more particularly the gripping means 60 in the retracted position, a position that is occupied in particular when the rod 34 is in the top position.

When the rod 34 is in the top position or more generally in a position that is different from the bottom position, the second magnetic means 110 formed by the magnets 112 of the levers 72 are not radially aligned with the first magnetic means 100 formed by the magnets 102 carried by the support 56.

In the position illustrated in FIG. 5, the levers 72 are returned magnetically toward the retracted position by the repelling force that the magnets 112 exert on one another, advantageously forming means for returning gripping means 60.

In this position, the magnetic field produced by the first magnetic means 100 has no effect on the gripping means 60 formed by the levers 72 and more particularly on the second magnetic means 110.

Figure 6:
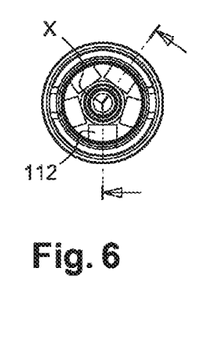
FIGS. 6 and 7 are cutaway views that show the lower part for gripping the transport device according to FIG. 3, with FIG. 6 showing a radial cutaway made at the height of the second magnetic means that are integral with the gripping means and that illustrate the vertical cutting plane corresponding to FIG. 7, with FIG. 7 illustrating in cutaway said lower part with said gripping means occupying the deployed position.

FIG. 6 shows more particularly the gripping means 60 in the deployed position, a position that is occupied in particular when the rod 34 reaches its bottom position.

When the rod 34 is moved downward, from its top position toward its bottom position, the second magnetic means 110 move simultaneously downward relative to the first magnetic means 100 carried by the support 56 that are stationary, with said second magnetic means 110 being moved until occupying, when the rod 34 reaches said bottom position, the position illustrated in FIG. 6.

When the rod 34 is close to reaching its bottom position, the magnets 112 carried by the upper part 80 of the levers 72 encounter the magnetic field of the magnets 102.

Since the repelling force that the magnets 102 apply to the gripping means 60 is greater than the repelling force mutually applied between them by the magnets 112, the magnetic return force of the levers 72 toward the retracted position is overcome and the levers 72 pivot toward the deployed position.

The repelling force produced by the magnets 102 is oriented radially toward the inside, or in the direction opposite to that of the return force, and applies to the upper part 80 for actuating each lever 72 for bringing about the change in position of the levers 72.

The repelling forces that are then exerted between each of the magnets 112 carried by a lever 72 and the set of magnets 102 carried by the support 56 are greater than the repelling forces that until then returned each of the levers 72 into its retracted position.

In parallel with the continuation of the travel for lowering the rod 34, the repelling forces will overcome the return force exerted on the levers 72 and bring about the change in position, with the levers 72 pivoting from the retracted position toward the deployed position as illustrated in FIG. 6 (in the absence of the preform 12).

Advantageously, in the deployed position illustrated in FIG. 6, the magnetic axis of said first magnetic means 100 carried by the support 56 is offset vertically in relation to the magnetic axis of said second magnetic means 110 carried by the gripping means 60.

As illustrated in FIG. 7, the magnetic axis of said first magnetic means 100 carried by the support 56 is therefore not merged with the magnetic axis of said second magnetic means 110 carried by the gripping means 60.

The second magnetic means 110 are in a deployed position offset vertically downward in relation to the first magnetic means 100, or advantageously offset vertically in the direction of insertion of the gripping means 60 inside the neck 16 of the preform 12.

For this reason, said deployed position of the gripping means 60 is a stable position, a position of equilibrium.

Advantageously, the gripping means 60 comprise means 120 that, elastically deformable, are designed to engage with the inner wall 24 of the neck 16 of the preform 12.

Preferably, said means 120 consist of pads. In the embodiment, each lever 72 comprises a housing 118 that is made in its lower part 82 for accommodating said pad 120.

Preferably, the pads 120 are made of, for example, elastomer material, such as alimentary silicone.

The use of pads 120 makes it possible to reduce the risks of marking the neck 16 during the gripping of the neck 16 of the preform 12.

Advantageously, the elastic deformation of the pads 120 also makes it possible for the gripping means 60 to have a greater tolerance in the face of variations of inner diameters of the necks 16 of the preforms 12, in particular in the case depicted called "narrow neck."

Below, in more detail, the general functioning of the transport device 10 will be described with reference to FIGS. 8 to 10 that illustrate the positions during the gripping of a preform 12, an operation that is also called "covering."

In a first stage, the actuating means 50 such as a fork act on the driving part 36 by applying to it a traction force, oriented vertically upward and shown diagrammatically by an arrow.

The traction force applied by the actuating means 50 has the effect of moving the rod 34 vertically upward, with said rod sliding from its bottom position until reaching the top position illustrated in FIG. 8.

Preferably and as indicated above, the movement of the rod 34 is then carried out against means for returning the rod 34 towards its bottom position, with said return means consisting of the spring 52.

The return spring 52 of the rod 34 is supported at its upper end on the support 56 by means of the ring 54, with said support 56 being stationary and integral with the body 30.

The return spring 52 of the rod 34 is movably connected by a lower end to the rod 34 that moves vertically relative to the support 56.

The spring 52 is supported at its lower end on a ring 122 that is immobilized vertically by a slit ring 124 that, integral with the rod 34, abuts against a shoulder 126 (see FIGS. 5 and 7) that the end fitting 70 of the control rod 34 comprises.

Preferably, the support elements of the spring 52 such as the ring 124 are not made of ferromagnetic materials so as not to bring about interference with the magnetic means.

Simultaneously or successively to the retraction of the rod 34 toward its top position, a preform 12 is brought into position for the purpose of its gripping by the gripping means 60 of the device 10.

Preferably, the preform 12 is introduced radially and its neck 16 is positioned perpendicular to the gripping means 60, with the axis O of the preform 12 advantageously being merged with the axis X of the transport device 10.

In this position, the preform 12 is supported by, for example, its collar 26, which is supported on transfer means (not shown), such as a transfer wheel.

In a second stage, when the preform 12 is in position, the actuating means 50 stop exerting said traction force on the rod 34, and the rod 34 is then automatically returned by the spring 52 toward its bottom position.

Advantageously, the weight of the fork that forms the actuating means 50 being applied to the driving part 36 and a return force oriented vertically downward by a spring of the cam and roller mechanism participate jointly in automatically returning the rod 34 toward its bottom position.

During the travel for lowering the rod 34 from the top position toward its bottom position, the gripping means 60 that occupy the retracted position are inserted without contact inside the neck 16 of the preform 12.

The intermediate position illustrated by FIG. 9 shows the means 60 for gripping the transport device 10 just before the change in position from the retracted position toward the deployed position takes place.

During the insertion inside the neck 16, the centering means 90 are not in contact with the neck 16, with the outer diameter of the centering device 90 advantageously being smaller than the inner diameter of the neck 16 of the preform 12.

The end of travel of the rod 34 to its bottom position is accompanied by the actuation of the gripping means 60 by the magnetic field of the magnetic means.

In the embodiment and as described above with reference to FIGS. 5 and 7, the magnets 102 that form the first magnetic means 100 carried by the support 56 and the magnets 112 that form the second magnetic means 110 carried by the levers 72 exert on one another mutually repelling forces that, being greater than the forces for returning the levers 72 toward the retracted position, bring about the change in position of levers 72 toward the deployed position.

Advantageously, the change in position of the gripping means 60 from the retracted position toward the deployed position is actuated by repelling owing to magnetic means, during the vertical movement downward of the rod 34.

Advantageously, the magnetic actuation of the gripping means 60 for carrying out the gripping is achieved during a movement in the same direction as that of the insertion of the gripping means 60 inside the neck 16.

The change in position of said gripping means 60 is carried out at the end of the travel of the rod 34, after the gripping means 60 have been inserted inside said neck 16 of the preform 12.

As shown in FIG. 10, with the gripping means 60 formed by the levers 72 being inserted through the opening 22 inside the neck 16 and occupying the deployed position, the gripping (or covering) of the preform 12 is then carried out.

The pads 120 carried by the levers 72 advantageously engage with the inner wall 24 of the neck 16 of the preform 12, with the levers 72 being stressed by repelling toward the deployed position by means of the magnetic field that produced by the first magnetic means 100 in combination with the second magnetic means 110.

To carry out the release of the preform 12, an operation also called "uncovering," the first stage that consists in moving the rod 34 from its bottom position toward its top position is carried out again.

The actuating means 50 again stress by traction the driving part 36 for moving the rod 34 from its bottom position toward its top position, and this against the spring 52 for returning the rod 34 toward its bottom position.

Advantageously, a very short rising travel of the rod 34 is sufficient to alter the equilibrium of the magnetic forces.

Thus, as soon as the first magnetic means 100 and the second magnetic means 110 will be offset vertically in relation to one another, the repelling forces applied until then to the levers 72 will decrease until becoming less than those applied by the means for returning the levers 72 toward the retracted position.

In the embodiment, the repelling forces exerted by the second magnetic means 110 then automatically bring about the magnetic return of the levers 72 toward the retracted position and by so doing release the preform 12 from the gripping means 60 movably connected to the rod 34 of the transport device 10.

Advantageously, when the preform 12 is in a so-called "neck up" position, the release of the preform 12 is facilitated by gravity.

When the rod 34 again reaches its top position, the gripping means 60 are retracted and the transport device 10 is armed, ready to carry out the gripping of another preform 12.

The embodiment that was just described constitutes only one embodiment that is preferred and provided by way of a nonlimiting example, with numerous variants being likely to be produced without, however, exceeding the scope of the invention.

Below, in a nonlimiting manner, several variants will be described, sometimes proceeding by comparison with the embodiment of the means 60 for gripping the transport device 10 shown in FIGS. 2 to 10.

In the embodiment, the magnetic means, both the first means 100 and the second means 110, are formed by permanent magnets, respectively 102 and 112.

As a variant, the magnetic means and more particularly the first magnetic means 100 consist of at least one electromagnet.

Advantageously, the use of at least one electromagnet forming the first magnetic means 100 carried by the support 56 makes it possible to control selectively the presence or the absence of the magnetic field for actuating the gripping means 60 and this by controlling the electrical supply of the electromagnet.

In addition, the use of at least one electromagnet makes it possible to vary the intensity of the magnetic field by varying the intensity of the current traversing it and therefore varying the gripping force applied by the gripping means 60 on the inner wall 24 of the neck 16 of the hollow body.

However, an electromagnet is an active magnetic element that consumes energy by comparison with a permanent magnet that, passive, does not need any.

This is one of the reasons for which, in the embodiment, the magnetic means are formed by permanent magnets.

As a variant, the magnetic means could also combine the use of active and passive elements, for example at least one electromagnet for the first magnetic means 100 and permanent magnets for the second magnetic means 110 in a manner analogous to the embodiment of FIGS. 2 to 10.

By comparison with a permanent magnet, the polarity of an electromagnet can advantageously be altered by reversing the direction of the current traveling through it, in particular for obtaining an attraction force and/or a repelling force.

In the embodiment, the second magnetic means 110 are advantageously carried by gripping means 60 because of their dual function, with the first function for magnetic return of the gripping means 60 toward the retracted position and the second function for actuation by magnetic interaction with the first magnetic means 100 for bringing about the change in position of the gripping means 60.

However, these two functions could be separate.

As a variant, the function for returning the gripping means 60 toward the retracted position is carried out, for example, not magnetically but with elastic return means such as a spring.

In the absence of the second magnetic means 110, the actuation of the gripping means 60 by the magnetic field is achieved, for example, by means of first magnetic means 100 that exert an attraction force on gripping means 60 comprising at least one part made of a ferromagnetic material, such as the upper part 80 for actuating the levers 72.

Advantageously, the first magnetic means 100 then exert on the parts 80 of the levers 72 a magnetic attraction force that can overcome the elastic return force and that can bring about the change in position of the gripping means 60 from the retracted position toward the deployed position.

By comparison with the embodiment in which the first magnetic means 100 carried by the support 56 are arranged radially outside of the gripping means 60, the first magnetic means 100 can also be arranged radially inside the gripping means 60.

As a variant, the first magnetic means 100 are not necessarily stationary in relation to the gripping means 60 that are movably connected to the rod 34.

The first magnetic means 100 could be, for example, carried by the rod 34, with the use of an electromagnet making it possible, for example, to produce selectively a magnetic field for the purpose of actuating it and this independently of a specified relative movement, such as the one of the rod between the top and bottom positions in the embodiment.

In the embodiment, the gripping means 60 consist of levers 72 that are mounted to move in rotation around the axis A defined by the articulation means 74.

As a variant, the gripping means 60 are mounted to move in translation between said retracted and deployed positions.

According to this variant, the gripping means 60 consist of elements that slide radially in relation to the rod 34, between said retracted and deployed positions.

In such a variant, the magnetic field that stresses the gripping means 60 advantageously acts by attraction.

The invention claimed is:

1. A device (10) for transporting a hollow body (12) that is equipped with a neck (16) that comprises a vertically-oriented inner wall (24) and an upper edge (20) that circumferentially delimits an opening (22) for access to an inside of said hollow body (12), with said device (10) comprising means (60) for gripping the hollow body (12) by engagement with the inner wall (24) of the neck (16) that are mounted at a lower free end of a rod (34) and movably connected to the rod (34), with said rod (34) being mounted to move vertically between:
   a top position in which the gripping means (60) are retracted upwardly by the rod (34) to make it possible to insert the neck (16) of the hollow body (12) radially into a specified reference position in relation to the gripping means (60) of the device (10), and
   a bottom position in which the gripping means (60) engage radially with the inner wall (24) of the neck (16) to ensure the gripping of the hollow body (12),
   wherein the gripping means (60) are mounted to move radially
   between:
   a retracted position in which the gripping means (60) are inserted vertically from top to bottom inside the neck (16), without contact with the inner wall (24), and
   a deployed position in which the gripping means (60) engage with the inner wall (24) of the neck (16),
   and the change in position of the gripping means (60) from at least one of said retracted and deployed positions is actuated by a magnetic field produced by magnetic element.

2. The device according to claim 1, wherein said gripping means (60) are forced into said deployed position by means of said magnetic field.

3. The device according to 2, wherein said magnetic element for actuating the gripping means (60) comprise at least the first magnetic element (100, 102) that selectively bring about the change in position of said gripping means (60), at least from the retracted position toward the deployed position, by application of said magnetic field on the gripping means (60).

4. The device according to claim 1, wherein said magnetic element for actuating the gripping means (60) comprise first magnetic element (100, 102) that selectively bring about the change in position of said gripping means (60), at least from the retracted position toward the deployed position, by application of said magnetic field on the gripping means (60).

5. The device according to claim 4, wherein said first magnetic element (100, 102) are mounted on a support (56) of the device (10) in relation to which the rod (34) is mounted to move vertically in such a way that said first magnetic element (100, 102) bring about the change in position of said gripping means (60) from the retracted position toward the deployed position when the rod (34), moved vertically downward from its top position, reaches its bottom position.

6. The device according to claim 5, wherein said first magnetic element (100, 102) are arranged on the support (56) of the device for producing a circumferentially continuous magnetic field.

7. The device according to claim 4, wherein the first magnetic element (100) consist of permanent magnets (102).

8. The device according to claim 4, wherein the magnetic element for actuating the gripping means (60) comprising second magnetic element (110, 112) that are carried by said gripping means, and a second magnetic element (110, 112) are arranged relative to the first magnetic element (100, 102) to have a polarity that is identical to that of said first magnetic element (100, 102) in such a way as to exert on one another a mutually repelling magnetic force.

9. The device according to claim 8, wherein the second magnetic element (110) consist of permanent magnets (112).

10. The device according to claim 9, wherein in the deployed position, said second magnetic element (110, 112) carried by the gripping means (60) are offset, vertically downward, in relation to said first magnetic element (100, 102) carried by the support (56).

11. The device according to claim 1, wherein the gripping means (60) are automatically returned toward the retracted position by returning means (112).

12. The device according to claim 11, wherein the magnetic element for actuating the gripping means (60) comprise second magnetic element (110, 112) that are carried by said gripping means, and the means for returning the gripping means (60) toward the retracted position consist of said second magnetic element (110, 112).

13. The device according to claim 12, wherein the second magnetic element (110) consist of permanent magnets (112).

14. The device according to claim 1, wherein the magnetic element for actuating the gripping means (60) comprising second magnetic element (110, 112) that are carried by said gripping means (60).

15. The device according to claim 1, wherein the gripping means (60) are mounted to move in rotation between said retracted and deployed positions around an axis (A).

16. The device according to claim 15, wherein the gripping means (60) consist of levers (72), each lever (72) comprising, vertically on both sides of said axis (A) of rotation, an upper actuating part (80) and a lower gripping part (82) that are connected by an intermediate connecting part (84) comprising said axis (A).

17. The device according to claim 1, wherein the device (10) comprises stopping means (88) that determine the retracted position of the gripping means (60).

\* \* \* \* \*